United States Patent [19]
Cho et al.

[11] Patent Number: 5,888,329
[45] Date of Patent: Mar. 30, 1999

[54] METHOD OF MANUFACTURING REINFORCED INSULATING PANEL

[75] Inventors: Se Hyun Cho; Sam Tae Jeong; Key Wook Jang, all of Kyungsangnam-Do, Rep. of Korea

[73] Assignee: Gye Chan Cho, Milyang-si, Rep. of Korea

[21] Appl. No.: 700,825

[22] Filed: Aug. 21, 1996

[30] Foreign Application Priority Data

Dec. 4, 1995 [KR] Rep. of Korea ............... 46408P95

[51] Int. Cl.$^6$ ............................................... B32B 7/08
[52] U.S. Cl. ........................... 156/93; 156/305; 428/102
[58] Field of Search ..................... 156/92, 93, 148, 156/305, 307.3; 428/102

[56] References Cited

U.S. PATENT DOCUMENTS

| | | | |
|---|---|---|---|
| 1,802,543 | 4/1931 | Upson | 156/93 |
| 2,137,756 | 11/1938 | Gould | 428/101 |
| 2,737,227 | 3/1956 | Brumel | 156/93 |
| 3,792,141 | 2/1974 | Offutt | 156/93 |
| 4,083,159 | 4/1978 | Hatch | 428/116 |
| 4,411,939 | 10/1983 | Hawkins | 428/102 |
| 4,822,659 | 4/1989 | Anderson | 428/100 |

*Primary Examiner*—Daniel Stemmer
*Attorney, Agent, or Firm*—Jacobson, Price, Holman & Stern, PLLC

[57] ABSTRACT

A method of making a reinforced insulating panel which includes the steps of covering insulating material, such as urethane foam of a regular size with glass fiber textiles, quilting the insulating material and the glass fiber textiles together so as to produce an integral middle member, covering the inner covering of the glass fiber of the middle member with an outer covering of the glass fiber and impregnating the covered member with a thermosetting resin and hardening the impregnated member. The glass fiber reinforced panel produced has excellent fire retardant and water repelling properties, has improved compressive strength and does not deform or delaminate easily.

7 Claims, 3 Drawing Sheets

METHOD OF MANUFACTURING REINFORCED INSULATING PANEL

BACKGROUND OF THE INVENTION

This invention relates to a method of manufacturing reinforced insulating panels, and particularly to a method of making reinforced insulating panels impregnated with thermosetting resin, which utilize glass fiber reinforced material provided in a three-dimensional construction, wherein the delamination between surface material and insulating material is minimized and wherein the mechanical durability thereof is great.

A conventional reinforced panel of aluminum-insulating material is shown in FIG. 1, and is used as carrying boxes on refrigerator vehicles or containers and comprise an insulating member 101 and aluminum panels 102 fixed to both faces of the insulating member 101. Containers for marine transportation made of such panels are likely to corrode at their surface materials due to seawater and sea wind. When applying such panels to refrigerator containers or carrying boxes of refrigerator vehicles, such containers and boxes suffer from vertically acting compression and severe buckling load.

When joining surface member and insulating member, e.g., urethane foam of simple laminated structure, insulating members are likely to isolate or break at the interfaces thereof, resulting in the loss of refrigerating and freezing-retaining properties, which shortens the lives of carrying boxes or refrigerator containers.

SUMMARY OF THE INVENTION

An object of this invention is to provide a reinforced insulating panel which has great mechanical endurance properties and remarkably represses or prevents the delamination between surface members and insulating members.

Another object of this invention is to provide a method of making a reinforced insulating panel which is of three-dimensional construction comprising insulating members and glass fiber textiles impregnated with thermosetting resin.

The reinforced insulating panel according to this invention is made by covering inner covering of glass fiber textiles with urethane foam of regular size, quilting the inner covering and urethane together, covering the quilted member with an outer covering of glass fiber textiles, and impregnating the outer-covered member with thermosetting resin and hardening the impregnated member.

Still another object of this invention is to provide a method of making a reinforced insulating panel comprising the steps of equalizing the length of urethane foam of regular size and glass fiber textiles, quilting the same-length members together so as to constitute reinforced members, providing partitioning members between the reinforced members, covering the surface of the reinforced members, and partitioning members with glass fiber textiles, impregnating the surface-covered member with thermosetting resin and hardening the impregnated member. As partitioning members, partitioning panels of FRP are inserted.

Alternatively, a single inner covering of glass fiber textiles longer than the insulating member is provided for covering the insulating member in the c-shape. The insulating member and single inner covering are quilted together for having vertical parts of the inner covering serving as partitioning members between the reinforced members.

Alternatively, upper and lower inner coverings of glass fiber textiles are provided, the edges of each inner covering being longer than the thickness of the insulating member by half. The margin parts of the edges are bent and fixed to the end faces of the insulating members thereby forming partitioning members.

The reinforced insulating panels of I-beam construction of this invention are obtained by any one of the above-described methods.

BRIEF DESCRIPTION OF THE DRAWINGS

Further features and details of the invention will be apparent from the following description of the embodiments which are given with reference to the accompanying drawings, in which.

DESCRIPTION OF PREFERRED EMBODIMENTS

Figure 1:
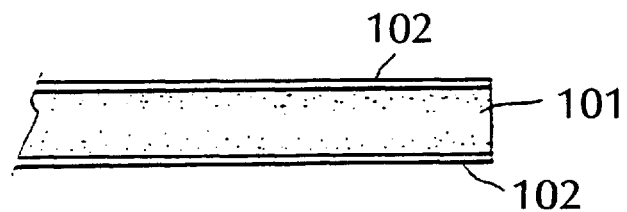
FIG. 1 is a sectional view of the conventional aluminum insulating panel.
Figure 2:
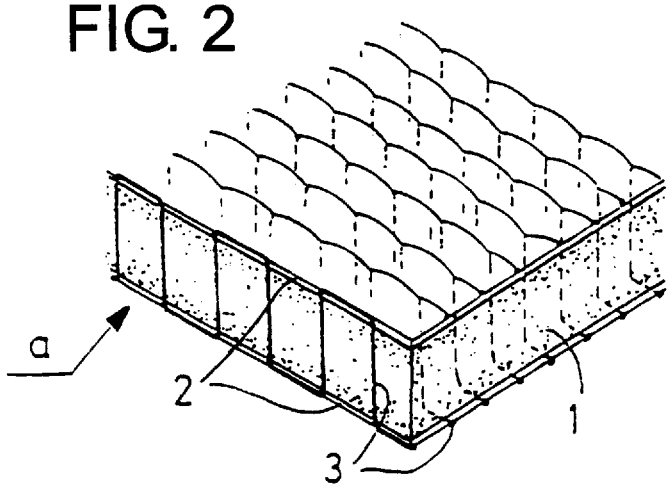
FIG. 2 is a perspective view of one embodiment of first molded goods of reinforced insulating panel of the present invention.
Figure 3:
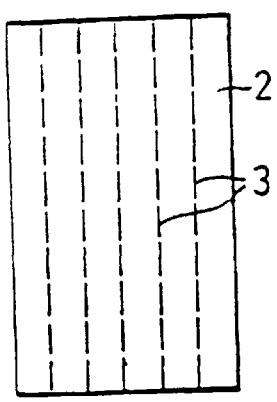
FIG. 3 is a plan view of FIG. 2.
Figure 4:
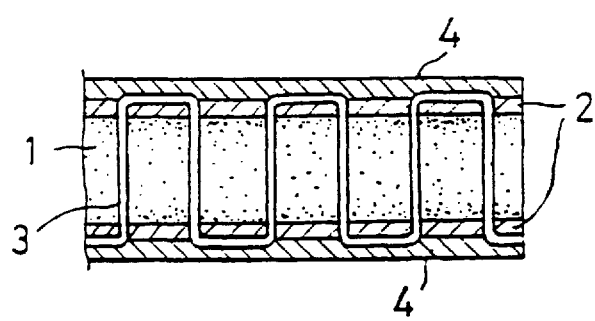
FIG. 4 is a sectional view of a finished reinforced insulating panel.

Referring to FIGS. 2 to 4, an inner covering of glass fiber textiles 2 covers both sides of an insulating panel 1 of urethane foam, or the like. The insulating panel 1 of regular shape and inner covering of glass fiber textiles 2 are quilted together by reinforcing fiber thread 3. The inner covering of glass fiber textiles 2, insulating panel 1 and reinforcing fiber thread 3 constitute a middle member (a). The middle member (a) has a three-dimensional construction. The material of the inner covering of glass fiber textiles 2 is roving fiber. The reinforcing fiber thread is made by glass fiber, carbon fiber or aramid fiber. The thickness and density of the reinforcing fiber thread 3 depends on the use of insulating panel 1. Each inner covering of glass fiber textiles 2 of the middle member (a) is enclosed by an outer covering of glass fiber 4 and then impregnated with thermosetting resin for fire retardancy. Thereby, reinforcing fiber thread 3, which has been exposed outside of the inner covering of glass fiber textiles 2 and thus has been in an unstable state, is in fixed position. The inner and outer coverings are made of one-direction or plain cloth.

The thermosetting resin is unsaturated polyester resin, epoxy resin or melamine resin and is thereby fire retardant. The condition of hardening depends on the kind of resins and the use of the insulating panel.

Thermosetting resin is used in the shape of prepeg which is made by pre-saturation of outer glass fiber 4. Otherwise, the thermosetting resin is produced by pouring liquid thermosetting resin into the reinforcing material and hardening the reinforcing material. The resin saturating process influences the durability and mechanical strength of the finished insulating panel. Therefore, during the process, molding should be achieved as close as possible so as not to produce pores.

Figure 6A:
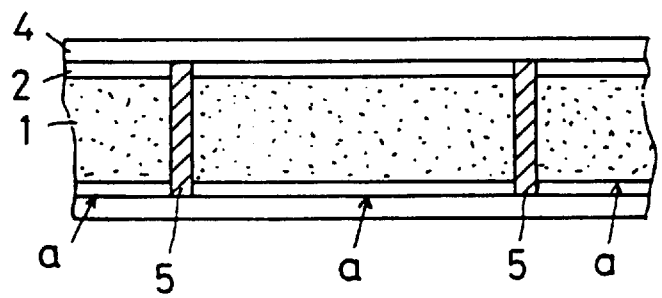
FIGS. 6A, 6B and 6C illustrate the reinforced insulating panels of the present invention having several kinds of partitioning members.

As shown in FIG. 6A, the middle members (a) obtained are arranged in a line. FRP partitioning members 5 are inserted between the middle members (a). An outer covering of glass fiber 4 encloses the middle member (a) and the partitioning member 5. Then, the enclosed middle member (a) is impregnated in the fire retardant thermosetting resin and hardened, thus producing the reinforcing material.

As described above, when using FRP partitioning members 5 as the partitioning member, the I-beam construction formed when molding FRP causes an increase in compressive load with respect to the horizontal direction of the panel face. Furthermore, when an external force acts in the vertical direction, the bending strength increases, causing deformation of the insulating reinforcing panel to decrease remarkably.

Figure 5A:
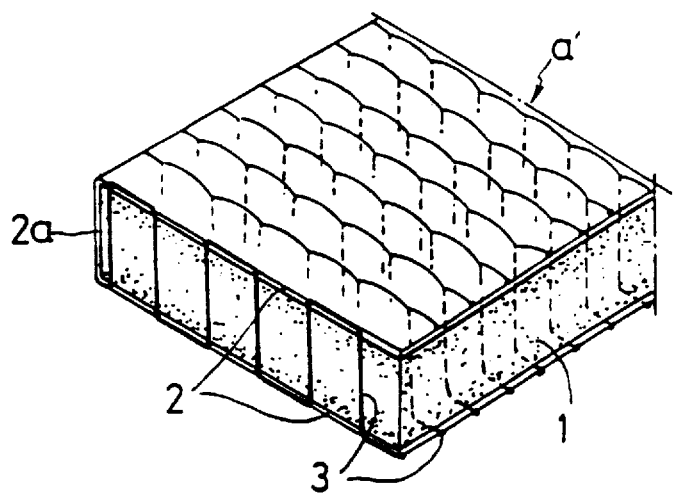
FIG. 5A is a perspective view of a middle member of one embodiment of this invention.

As shown in FIG. 5A, an inner covering of glass fiber textiles 2 is larger than an insulating panel 1 of urethane foam, or the like, and encloses the insulating panel 1 in the U-shape. That is, the inner covering of glass fiber textiles is longer than one face of the insulating panel 1. A reinforcing fiber thread 3 quilts the insulating panel 1 and the inner face of glass fiber textiles 2, thus forming integral margin members 2a. The integral margin members 2a serve as partitioning members. The members 1, 2, 3 and 2a constitute a middle member (a').

Figure 6B:
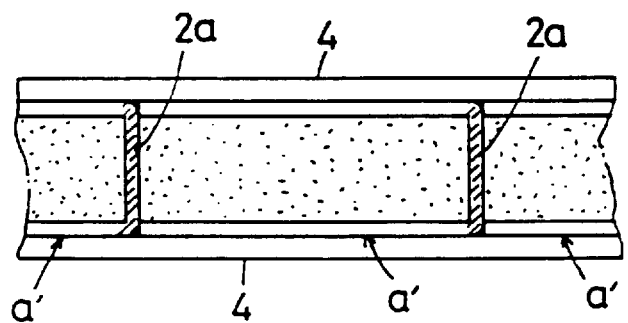

As shown in FIG. 6B, the middle members (a') are arranged in a line as follows. The back of one of the middle members (a') contacts an open face of the other middle member (a'). Outer coverings of glass fiber 4 enclose the upper and lower faces of the middle members (a'). Then, the enclosed middle members (a') are impregnated with thermosetting resin and hardened, thereby producing a deformed reinforcing material.

Figure 5B:
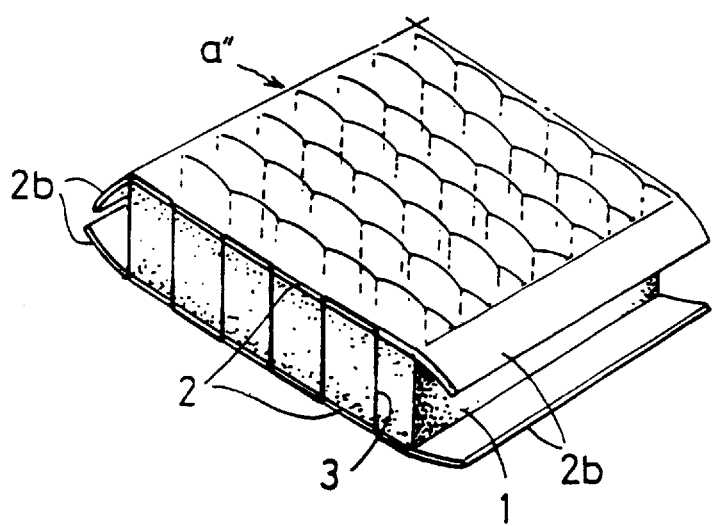
FIG. 5B is a perspective view of a middle member of another embodiment of this invention.

As shown in FIG. 5B, upper and lower inner coverings of glass fiber textiles 2 are larger than the insulating panel 1 of urethane foam, or the like (2) and enclose the insulating panel 1 in the shape of U and inversed U. That is, the upper and lower glass fiber inner covering of glass 2 enclose approximately half of the one face of the insulating panel 1. The insulating panel 1 and the upper and lower coverings of glass fiber textiles 2 are quilted together by reinforcing fiber thread 3. Separable margin parts 2b serve as the partitioning member. The members 2b, 1, 2 and 3 constitute middle members (a").

Figure 6C:
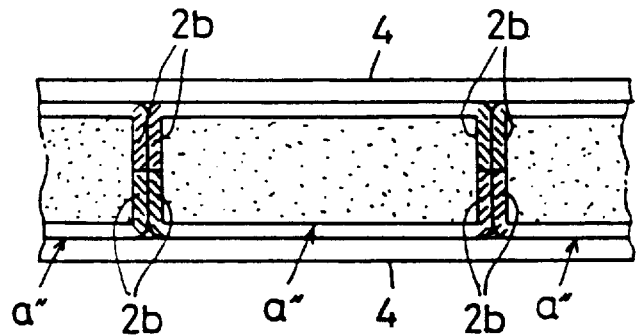

As shown in FIG. 6c, the middle members (a") are arranged in a line and are enclosed by outer coverings of glass fiber 4. The enclosed middle members (a") are impregnated with fire retardant thermosetting resin and hardened. Thus, a deformed reinforcing material in accordance with a second embodiment is obtained.

Regardless of what methods are chosen, glass fiber textiles and reinforcing textile thread which have passed the hardening process serve as an excellent FRP. Furthermore, resin may be impregnated into the glass fiber textiles by capillary action and hardened. Therefore, each strand of fiber becomes a kind of FRP bar.

According to a bending test, when thickness of the covering was about 1.5–2.0 t when using textiles having the same property as leather, the strength was more than two times that of insulating panels having no partitioning members and the deformation decreases by less than ½ when compared with insulating panels having no partitioning members.

The insulation-reinforcing panels of this invention are reinforced in a three-dimensional way and have a unitary construction. Therefore, the insulation-reinforcing panels of this invention sufficiently endure continuous compression and withstand buckling. Furthermore, the insulation-reinforcing panels of this invention generally are capable of absorbing shock. Therefore, the panels have excellent anti-shock properties.

The conventional aluminum/urethane foam containers, when used for sealift, are susceptible to corrosion by seawater. However, when applying the insulation-reinforcing panel of three-dimensional construction to containers, or the like, such containers are not likely to corrode as a result of seawater and their mechanical life increases. Furthermore, the weight of such containers decreases by 20%.

In addition, the reinforced insulation panel of this invention is reinforced by reinforcing material, e.g., glass fiber textiles, therefore, even if the reinforced insulating panel is cracked, the cracks do not spread. Therefore, the reinforced insulating panel of this invention has a much longer life than conventional insulating panels.

FRP molding materials are easier to manufacture than general metal materials. The FRP molding materials are attached to metal panels with rivets, or the like. However, since the reinforced insulating panels are simultaneously impregnated with thermosetting resin, the joining strength is great, thus preventing delamination. Furthermore, the panels have a fluid blocking function wherein fluid cannot penetrate the inside of the panel.

In addition, by providing partitioning members between the middle members, the compressive load in the horizontal direction of the panel face increases and the bending strength with respect to the external force acting in the vertical direction also increases. Therefore, the reinforced insulating panel is prevented from deforming.

While the invention has been described in connection with the preferred embodiments, it will be understood that modifications thereof within the principles outlined above will be evident to those skilled in the art and thus the invention is not limited to the preferred embodiments but is intended to encompass such modification, within the scope of the appended claims.

What is claimed is:

1. A method for producing a reinforced insulating panel, said panel consisting essentially of an insulating member sandwiched between, and quilted together with, a first reinforcing member, a second reinforcing member covering the quilted first reinforcing member, said method comprising the steps of:
   (a) covering a foam insulating member with a first reinforcing member of glass fiber;
   (b) quilting the foam insulating member together with the first reinforcing member to form a quilted middle member;
   (c) covering the quilted middle member with a second reinforcing member of glass fiber to form a covered middle member;
   (d) impregnating the covered middle member with a thermosetting resin; and
   (e) hardening the thermosetting resin to produce a reinforced insulating panel.

2. The method of claim 1, further comprising the first reinforcing member being a single layer.

3. The method of claim 2, further comprising the second reinforcing member being a single layer.

4. The method of claim 1, further comprising:
   adjacently aligning at least two quilted middle members and inserting partitions between said adjacently aligned members before covering the aligned members with the second reinforcing layer.

5. The method of claim 4, further comprising the partitions being of fire retardant material.

6. The method of claim 1, further comprising:

provviding the first reinforcing member of a size larger than that of the insulating member such that the first reinforcing member covers at least one edge of the insulating member.

7. The method of claim 6, further comprising:

adjacently aligning at least two quilted middle members such that the at least one covered edge of the insulating member forms a partition between said adjacently aligned members.

* * * * *